United States Patent Office 3,341,541
Patented Sept. 12, 1967

3,341,541
PROCESSES AND INTERMEDIATES FOR PYRIMIDINE DERIVATIVES
Max Hoffer, Nutley, N.J., assignor to Hoffmann-La Roche Inc., Nutley, N.J., a corporation of New Jersey
No Drawing. Filed July 9, 1965, Ser. No. 470,917
17 Claims. (Cl. 260—256.4)

This application is a continuation-in-part of application Ser. No. 454,168, filed May 7, 1965, now abandoned which in turn is a continuation-in-part of Ser. No. 410,710, filed Nov. 12, 1964.

The present invention relates to novel processes for the preparation of pyrimidine compounds and to intermediates therefor. More particularly, it relates to processes and intermediates for preparing pyrimidine compounds of the formula

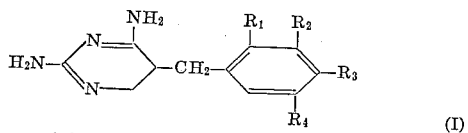

(I)

wherein $R_3$ and $R_4$ are halogen (chlorine, bromine, or fluorine), methyl, or lower alkoxy, $R_1$ is hydrogen, methyl, chlorine, or methoxy; and $R_2$ is hydrogen, chlorine, or methoxy.

A preferred group of compounds within the scope of Formula I prepared by the processes of the invention are those wherein $R_2$, $R_3$ and $R_4$ have the same meaning as in Formula I and $R_1$ is either hydrogen or methyl.

The compounds of Formula I prepared by the processes of the invention are useful as antibacterial agents, particularly for topical applications. They are also useful as antibacterial agents in combination with the antibacterial sulfonamides, e.g., sulfisoxazole, sulfamethoxazole, sulfadimethoxine, sulfaquinoxaline, etc. For example, a typical adult dose of a combination of sulfisoxazole and a compound of Formula I for oral administration is 0.5 g. of sulfisoxazole and 100 mg. of a compound of Formula I in a unit dosage form, e.g., tablet, capsule, aqueous suspension, troche, etc., compounded with the usual pharmaceutical excipients. It is to be understood, however, that the instant invention relates only to intermediates and processes for the preparation of the compounds of Formula I, and not to the compounds per se or to their use in combination with antibacterial sulfonamides.

The instant process is carried out according to the following reaction scheme.

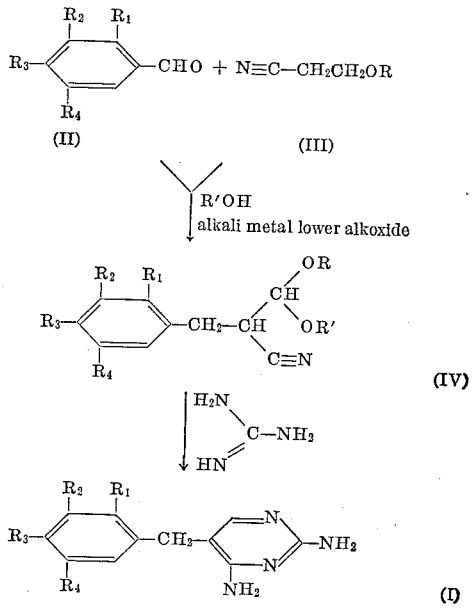

In the above reaction scheme, $R_1$ through $R_4$ have the meanings given for Formula I, and R and R' are lower alkyl groups, preferably methyl.

The above reaction is carried out by first reacting an aldehyde of Formula II with a β-lower alkoxy propionitrile of Formula III in the presence of an alkali metal lower alkoxide, such as sodium methoxide, potassium ethoxide, etc., and a lower alkanol of the formula R'OH, e.g., methanol, ethanol, propanol, etc. The reaction temperature is not critical, but is generally in the range of about 60 to about 140° C. The reaction product obtained is a compound of Formula IV. In some instances an intermediate of the formula

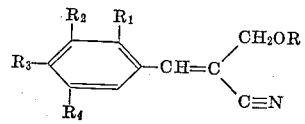

is formed first, which, however, is readily converted into a compound of Formula IV by treatment with R'OH in the presence of an alkali metal lower alkylate under substantially anhydrous conditions. The reaction temperature is also not critical for this step, and temperatures of about 60 to about 140° C. are suitable here also. The compound of Formula IV is then reacted with guanidine in almost quantitative yield to form a compound of Formula I.

The aldehydes of Formula II are in the main known compounds. Those compounds which may be novel can readily be prepared by known techniques, for example, by the Vilsmeyer reaction [Methoden der Organischen Chemie (Houben Weyl) (1954) volume: Sauerstoff-Verbindungen II, Teil. 1, p. 29] or by the Rosenmund method [Organic Synthesis, I.C., p. 1332], etc. The above process has the significant advantage of resulting in the preparation of compounds of Formula I in a surprisingly higher yield than all prior art processes known for preparing compounds within the scope of Formula I, for example, the processes given in U.S. Patent No. 3,049,544 to Stenbuck et al.

The terms "lower alkyl" and the lower alkyl portion of the term "lower alkoxy" employed herein are to be understood to refer to straight and branched chain alkyl groups having from 1 to 7 carbon atoms, e.g., methyl, ethyl, propyl, isopropyl, butyl, hexyl, heptyl, etc.

The invention will be better understood from the following examples which are given for illustration purposes only and are not meant to limit the invention.

EXAMPLE 1

*Preparation of 2,4-diamino-5-(2',4',5'-trimethoxybenzyl)-pyrimidine*

Acetic anhydride (485 g.=450 ml.) were placed in a 2-liter three-neck flask equipped with stirrer, thermometer and cooling bath. Concentrated sulfuric acid, 32 g., was added and the temperature adjusted to 35–40°. Benzoquinone, 162 g., was added in small portions over a period of 45–60 minutes at a temperature of 40–50°. Occasional chilling of the vessel with cold water will be necessary. After all the benzoquinone has been added, the mixture was stirred for 30–45 minutes at 40–50° and then allowed to cool to approximately 25°. The content of the flask was poured into 2.2 liters of ice water under stirring. The white precipitate was filtered by suction at 10° C. and washed on the filter each time with 300 ml. of water at a temperature of 5–10° C.

Methanol, 600 ml., was in the meantime placed in a three-neck, 5-liter flask equipped with stirrer, thermometer, reflux condenser, dropping funnel and cooling bath and the filter cake of triacetoxybenzene added to the solvent. Dimethylsulfate 1420 g.=1055 ml., was added to the mixture. A clear, homogeneous solution was obtained. A solution of 900 g. of sodium hydroxide in 900 ml. of water was slowly dropped into the mixture with stirring and cooling with ice water. The temperature was kept at 38–44° by cooling with ice water and regulating the rate of the addition of the alkali. The process required approximately 2½ hours. After all the alkali had been added, stirring was continued at 40–45° for 30 minutes and the cooling bath replaced by a glass col heater. The mixture was now gradually heated to 82–84° and refluxed under stirring for 30 minutes. A heavy off-white precipitate of sodium salts had formed in the flask. The mixture was allowed to stand overnight and then poured into 3 liters of cold water. The salts dissolved and the solution was extracted thoroughly under good stirring 4 times, each time with 500 ml. of benzene. The combined benzene layers were washed twice with 200 ml. of water, dried over sodium sulfate and the benzene distilled off from a water bath in vacuo. The residue was distilled in vacuo at 122–124° at 8–10 mm. (128° at 12 mm.) as a clear, colorless oil.

1,2,4-trimethoxybenzene, 101 g. (0.6 mole) and dimethylformamide, 55 g. (0.65 mole) were placed into a 1-liter, three-neck flask equipped with stirrer, reflux condenser thermometer and dropping funnel and immersed into a bath of ice water. Phosphorous oxychloride, 115 g. (0.75 mole) was dropped into the mixture under stirring over a period of 30–45 minutes at 20°. After termination of the addition of phosphorous oxychloride, the cooling bath was removed and replaced by a heating coil. The temperature rose spontaneously to 50–55°, and after subsiding of the spontaneous reaction, the mixture was heated to 95° for 2½ hours. The solution was allowed to cool to 25° and then poured into 300 g. of ice plus 200 g. of water in a 2-liter beaker. Sodium acetate (200 g.) (triple hydrate) was added under stirring in portions to a pH of 5. Stirring was continued under cooling with ice water for 2 hours when a thick, creamy white crystallization developed. The crystal mass was filtered by suction, pressed off on the filter, and washed on the filter twice with 100 ml. of ice cold water. The crude 2,4,5-trimethoxy-benzaldehyde thus obtained was dried in vacuo over CaCl$_2$ at room temperature. The product, melting at 109°–111°, is pure enough for the next step. A pure sample recrystallized from water melts at 112–114°.

Sodium, 5.2 g., was dissolved in 260 ml. of methanol in a three-neck flask equipped with stirrer, reflux condenser and heating mantle. β-Ethoxypropionitrile (42 g.=0.425 mole)

and 2,4,5-trimethoxybenzaldehyde (42 g.=0.0214 mole) were added and the mixture refluxed for 12 to 15 hours (overnight). After allowing the mixture to cool somewhat, a methanolic 40–50 percent guanidine solution (80 ml.) was added (prepared by stirring 61 g. of guanidine hydrochloride into a solution of 14.5 g. of sodium in 200 ml. of methanol, filtering from the precipitated sodium chloride by suction, washing the precipitate twice with 50 ml. of methanol and evaporating the filtrate in vacuo to 80 ml. under exclusion of carbon dioxide). The mixture was refluxed under stirring for 4 hours, seeding crystals of the product were added, and refluxing continued under stirring for 12 hours. Crystallization was completed by allowing it to stand at 0–5° for 24 hours under exclusion of carbon dioxide. The crystals were filtered by suction. The crystals were slurried with 40 ml. of cold methanol and filtered again by suction. They were then washed on the filter subsequently with 20 ml. of water, 10 ml. of methanol and 40 ml. of ether. The material showed a melting point of 208–210° and was yellowish in color.

To purify it, 27.5 g. of the crude material was suspended at 80–90° in 200 ml. of water and 10 ml. of acetic acid were added. The yellow solution was chilled to 10–15° and 35 ml. more of acetic acid was added. A heavy, white crystallization of the acetate rapidly developed. The crystals were filtered by suction, pressed off on the filter thoroughly and washed twice on the filter with 20 ml. of ice cold 15 percent aqueous acetic acid each time. The filter cake was dissolved in 150 ml. of hot water, the solution charcoaled and the product precipitated from the filtrate by the gradual addition of 50 ml. of 30 percent sodium hydroxide solution. The product deposited as a sandy white crystal powder. After chilling, the crystals were filtered by suction, washed alkali free with water and dried, melting point 212–213°.

The crude product was recovered, in addition, from the mother liquor of the acetate by evaporation, in vacuo, dissolving the residue in 50 ml. of hot water and precipitation with 25 ml. of 30 percent aqueous sodium hydroxide solution.

EXAMPLE 2

Preparation of 2,4-diamino-5-(2,4,5-trichlorobenzyl)-pyrimidine 2,4,5-trichlorobenzaldehyde (62.85 g.=0.3 mole) were added to a mixture of sodium methylate [from 6.9 g. sodium (0.3 equiv.) in methanol] and β-methoxypropionitrile (51 g.=0.6 mole) and the solution refluxed for 5 hours. It was chilled after the addition of 60 ml. of water to crystallize the product, and allowed to stand at 0–5° overnight. The crystals were filtered by suction, pressed off and washed on the filter twice, each time with 50 ml. of cold 80 percent methanol. 55 g. (60 percent of the theory) of crude 2,4,5-trichloro-2′-cyano-2′,3′-dihydrocinnamaldehyde dimethyl acetal was thus obtained. After recrystallization from 150 ml. of methanol, 46 g. (50 percent) of white needles of 2,4,5-trichloro-2′-cyano-2′,3′-dihydrocinnamaldehyde dimethyl acetal, melting at 77–78°, were obtained.

2,4,5 - trichloro-2′-cyano-2′,3′-dihydrocinnamaldehyde dimethyl acetal (30.85 g.=0.1 mole) was refluxed with 200 ml. of 1 N methanolic guanidine solution for 2 hours under stirring. The methanol was distilled off completely, finally from an oil bath of 110–120°. The crystalline, slightly discolored residue was slurried with water, filtered by suction and washed on the filter with a little alcohol and ether. The crystalline residue was dissolved in a boiling solution of 120 ml. of acetic acid and 350 ml. of water and the solution charcoaled hot. The colorless filtrate deposited, upon chilling, a crystallized acetate. Without recovering the latter, the filtrate was made alkaline with a solution of 100 g. of sodium hydroxide in 300 ml. of water and the product filtered by suction, washed with water and dried. 30.5 g. of 2,4-diamino-5-(2,4,5-trichlorobenzyl)pyrimidine of melting point 248° (95 percent of theory) was obtained.

EXAMPLE 3

Preparation of 2,4-diamino-5-(3,4,5-trichlorobenzyl) pyrimidine 3,4,5-trichlorobenzaldehyde (40 g.=0.191 mole), β-methoxypropionaldehyde (34 g.=0.4 mole) and a solution of sodium in methanol (4.4 g. sodium=0.19 atom in 100 ml. methanol) were mixed and refluxed under stirring for 4 hours. The brownish solution was diluted with 200 ml. of water and the precipitated oil extracted with ether. After evaporation of the ether, the residue was fractionated in a vacuum. 3,4,5-trichlorobenzyl ·1-cohol distilled at 155–170°/11 mm. (10 g.=25 percent) solidifying in the receiver. A sample recrystallized from heptane melted at 111–112°. 3,4,5-trichloro-2′-cyano-2′,3′-dihydrocinnamaldehyde dimethyl acetal followed at 195–208°/11 mm. (20 g.=35 percent), crystallizing upon standing. A sample recrystallized from methanol melted at 85–86°.

3,4,5 - trichloro-2′-cyano-2′,3′-dihydrocinnamaldehyde dimethyl acetal (15 g. crude=0.05 mole) was refluxed with methanolic guanidine solution (100 ml.=1 molar) for 2 hours and then the solvent completely distilled off within 2 hours. The solid crystalline residue was slurried with water and filtered by suction. To purify it, it was transformed into the well crystallized acetate by slurrying it with 100 ml. of hot 20 percent aqueous acetic acid, chilling and filtering by suction. The free base, 2,4-diamino - 5 - (3,4,5-trichlorobenzyl)pyrimidine, liberated from the acetate with an excess of sodium hydroxide solution, melted at 285–286°. The yield amounted to 13.5 g. corresponding to 86 percent of the theory. A sample dried at 80° analyzed for a monohydrate.

EXAMPLE 4

*Preparation of 2,4-diamino-5-(3,4,5-trimethoxybenzyl) pyrimidine*

Sodium (6 g.=0.26 atom) was dissolved in methanol (300 ml.) under stirring and refluxing. β-methoxypropionitrile (47.5 g.=0.55 mole) and 3,4,5-trimethoxybenzaldehyde (98 g.=0.5 mole) were added and the mixture refluxed gently for 4 hours. The mixture was then chilled and 150 ml. of water was added. The product crystallized rapidly. Crystallization was allowed to proceed at 5–10° under stirring for 1 hour. The product was filtered by suction and washed on the filter with 200 ml. of 60 percent ice cold methanol. The crude material was air-dried and used for further steps without purification. It melted at 78–80°. A pure sample, recrystallized from methanol, melted at 82°. The yield of 3,4,5-trimethoxy-2'-methoxymethylcinnamonitrile was 92 g., corresponding to 70 percent of the theory.

Sodium (19 g.=0.83 atom) was dissolved in methanol (300 ml.), 106 g. of 3,4,5-trimethoxy-2'-methoxymethylcinnamonitrile was added and the mixture gently refluxed for 24 hours. The solution, which had turned brown, was poured into 1 liter of water and the precipitated oil extracted repeatedly with benzene. The combined benzene layers (500–700 ml.) were washed 3 times with 500 ml. of water, the benzene removed by evaporation in a vacuum from a water bath, and the brown residual oil distilled in vacuo, boiling point 215–225°/11 mm. The clear, viscous oil, 3,4,5-trimethoxy-2'-cyano-dihydrocinnamaldehyde dimethyl acetal, weighed 83 g. (71 percent of the theory), and showed a $n_D^{23}$=1.5230. It solidified upon standing. A sample recrystallized from methanol melted at 69–70° and showed a strong melting point depression with the starting material; $n_D^{25}$=1.5190.

3,4,5 - trimethoxy-2'-cyano-dihydrocinnamaldehyde dimethyl acetal (31.5 g.=0.107 mole) was refluxed with methanolic guanidine solution (200 ml. containing 0.25 mole of guanidine) for 2 hours. The methanol completely distilled off under stirring, finally from a bath of 110–120° until the residue solidified completely to a yellowish crystalline mass. After allowing to cool, it was slurried with 100 ml. of water and collected by vacuum filtration and dried. The yield of 2,4-diamino-5-(3,4,5-trimethoxybenzyl)pyrimidine amounted to 28 g. (91 percent of the theory). The material showed the correct melting point of 199–200° and was, however, yellowish discolored.

20 g. of the above product was added to 30 ml. of 3 N aqueous sulfuric acid at 60° under stirring. The solution was chilled under stirring to 5–10°. The crystalline sulfate was collected by vacuum filtration and washed on the filter twice with 10 ml. of cold 3 N aqueous sulfuric acid each time. From the filtrate there was recovered 1.3 g. (6.5 percent) of discolored material melting at 195–196° and which can be added to subsequent purification batches. The sulfate on the filter was dissolved in 200 ml. of hot water, the solution charcoaled hot, and the product precipitated from the clear colorless filtrate by the gradual addition of a solution of 20 g. of sodium hydroxide in 40 ml. of water under chilling. The precipitate was filtered by suction and washed thoroughly with water on the filter. The white material, 17.5 g. (88 percent) showed the correct melting point of 200–201°.

EXAMPLE 5

*Preparation of 2,4-diamino-5-(3,4-dimethoxybenzyl) pyrimidine*

Veratrumaldehyde (166 g.=1 mole), methoxypropionitrile (95 g.=1.1 mole) and methanolic sodium methylate solution (11 g. sodium dissolved in 400 ml. of absolute methanol) were refluxed under stirring for 4 hours. The solution, upon chilling to 0° and seeding, crystallized. The crystals were filtered by suction and washed on the filter with 200 ml. of ice cold 60 percent methanol. The air-dried material, 3,4-dimethoxy-2'-methoxymethyl-cinnamonitrile, weighed 147 g. By diluting the filtrate with water, benzene extraction and vacuum distillation (boiling point=190–208°), a second crop of 35 g. was recovered, raising the yield to 77.5 percent. A sample recrystallized for characterization and analysis from methanol, melted at 75°. $n_D^{25}$=1.5862.

3,4 - dimethoxy-2'-methoxymethyl-cinnamonitrile (180 g.=0.775 mole) and methanolic sodium methylate solution (37 g. of sodium=1.6 atoms dissolved in 600 ml. of absolute methanol) were refluxed under stirring for 24 hours. The brown solution was diluted with 1.5 liters of water and the precipitated oil extracted with benzene (500 ml.). The benzene layer was washed repeatedly with water containing small amounts of acetic acid and the benzene evaporated in a vacuum. The residue, 3,4-dimethoxy-2'-cyanodihydrocinnamaldehyde dimethyl acetal, distilled at 205–210° as a colorless oil, solidifying in the receiver upon standing. The yield of 152 g. corresponded to 74.5 percent of the theory. A sample for characterization of the compound and analysis was recrystallized from methanol; $n_D^{25}$=1.5235; melting point 50–51°.

3,4 - dimethoxy - 2'-cyanodihydrocinnamaldehyde dimethyl acetal (26.5 g.=0.1 mole) was refluxed with a methanolic guanidine solution (250 ml., 1 N) for 2 hours and then the solvent distilled off completely within 2 hours. The crystalline residue was slurried with 100 ml. of water and washed on the filter with a little alcohol and ether. The yield of 24.5 g. corresponded to 95.5 percent of the theory. The product, 2,4-diamino-5-(3,4-dimethoxybenzyl)pyrimidine, showed the correct melting point of 233°.

EXAMPLE 6

*Preparation of 2,4-diamino-5-(4,5-dimethoxy-2-methylbenzyl)-pyrimidine*

4,5-dimethoxy-2-methylbenzaldehyde (90 g., 0.5 mole), methoxypropionitrile (50 g., 0.59 mole) and a methanolic sodium methylate solution (5.5 g. of sodium dissolved in 150 ml. of methanol) were refluxed under stirring for 4 hours. The solution was poured into 1 liter of water and extracted with benzene. The benzene layer was washed with water, the solvent evaporated in vacuo from a water bath and the residue distilled at 200–208°. The product, 4,5-dimethoxy-2-methyl-2'-methoxymethylcinnamonitrile, a yellowish oil, solidified upon standing. The yield of 103 g. corresponded to 83 percent of the theory. A sample recrystallized from methanol melted at 68–69°; $n_D^{25}$=1.5823.

4,5 - dimethoxy - 2 - methyl - 2 - methoxymethylcinnamonitrile (283 g., 1.145 mole) was refluxed with a methanolic sodium methylate solution (53 g. of sodium, 2.29 atoms dissolved in 800 ml. of absolute methanol) for 24 hours. The brown solution was poured into 1.5 liters of water and the precipitated oil extracted with benzene. The benzene layer was washed repeatedly with water containing a small amount of acetic acid. The benzene was evaporated in a vacuum from a water bath and the residue distilled at 205–211°. The colorless distillate solidified upon standing. The yield of 250 g. of 4,5-dimethoxy-2-methyl-2'-cyanodihydrocinnamaldehyde dimethyl acetal corresponded to 78 percent of the theory. A sample recrystallized from methanol melted at 60–61°. $n_D^{24}$=1.5228.

4,5-dimethoxy-2-methyl-2'-cyanocinnamaldehyde dimethyl acetal (55.8 g., 0.2 mole) was refluxed with a methanolic guanidine solution (250 ml., 1 molar) for 2 hours and then the solvent was distilled off completely. The crystalline residue, 2,4-diamino-5-(4,5-dimethoxy-2-methylbenzyl-pyrimidine, was slurried with water (100 ml.), filtered by suction and washed with a little ice cold alcohol and ether. The yield of 47 g. corresponded to 86 per cent of the theory. The material melted at 233°. Recrystallized from alcohol (1 g. from 30 ml.), the melting point remained unchanged.

I claim:

1. A process for the preparation of a compound of the formula

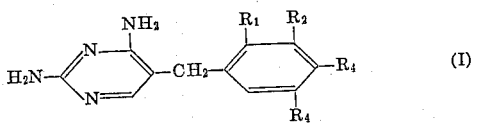

wherein $R_1$ is hydrogen, methyl, chlorine, or methoxy; $R_2$ is hydrogen, chlorine, or methoxy; and $R_3$ and $R_4$ are each lower alkoxy;
comprising the steps of
(a) reacting an aldehyde of the formula

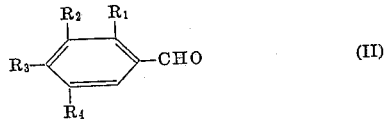

with a compound of the formula $$N\equiv C-CH_2CH_2OR \quad (III)$$

in the presence of an alkali metal lower alkylate and a lower alkanol to form a compound of the formula

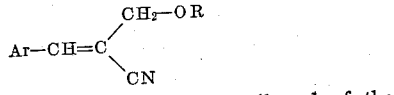

(b) treating said compound with an alkanol of the formula $$R'-OH$$

in the presence of an alkali metal lower alkylate under substantially anhydrous conditions

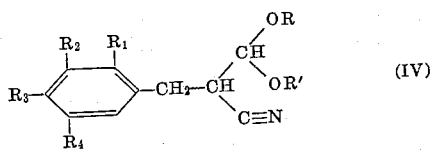

(c) recovering the compound of Formula IV; and
(d) reacting said compound of Formula IV with guanidine to give a compound of Formula I;
wherein in the above Formulae $R_1$, $R_2$, $R_3$, and $R_4$ have the same meaning as given above for the compound of Formula I, and R and R' are lower alkyl.

2. A process according to claim 1 wherein $R_1$ is hydrogen or methyl.

3. A process according to claim 1 wherein the compound of Formula II is 2,4,5-trimethoxybenzaldehyde.

4. A process for the preparation of 2,4-diamino-5-(3,4,5-trimethoxybenzyl)pyrimidine comprising the steps of
(a) reacting together β-lower alkoxy propionitrile and 3,4,5-trimethoxybenzaldehyde in the presence of an alkali metal lower alkoxide and a lower alkanol to form 3,4,5-trimethoxy-2'-lower alkoxy methylcinnamonitrile;
(b) reacting the cinnamonitrile with an alkali metal lower alkoxide in a lower alkanol under substantially anhydrous conditions to form 3,4,5-trimethoxy-2'-cyano-dihydrocinnamaldehyde lower alkyl lower alkyl acetal; and
(c) recovering the 3,4,5-trimethoxy-2'-cyano-dihydrocinnamaldehyde lower alkyl lower alkyl acetal; and
(d) reacting said acetal with guanidine to form 2,4-diamino-5-(3,4,5-trimethoxybenzyl)pyrimidine.

5. A process for the preparation of 2,4-diamino-5-(4,5-dimethoxy-2-methylbenzyl)pyrimidine comprising the steps of
(a) reacting together β-lower alkoxy propionitrile and 4,5-dimethoxy-2-methylbenzaldehyde in the presence of an alkali metal lower alkoxide and a lower alkanol to form 4,5-dimethoxy-2-methyl-2'-lower alkoxy methylcinnamonitrile;
(b) reacting the cinnamonitrile with an alkali metal lower alkoxide in a lower alkanol under substantially anhydrous conditions to form 4,5-dimethoxy-2-methyl-2'-cyano-dihydrocinnamaldehyde lower alkyl lower alkyl acetal;
(c) recovering the 4,5-dimethoxy-2-methyl-2'-cyano-dihydrocinnamaldehyde lower alkyl lower alkyl acetal; and
(d) reacting said acetal with guanidine to form 2,4-diamino-5-(4,5-dimethoxy-2-methylbenzyl)pyrimidine.

6. A compound of the formula

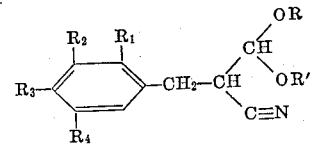

wherein $R_1$ is hydrogen, methyl, chlorine, or methoxy; $R_2$ is hydrogen, chlorine, or methoxy; $R_3$ and $R_4$ are each either halogen, methyl, or lower alkoxy; and R and R' are lower alkyl.

7. A compound of claim 6 wherein $R_1$ is either hydrogen or methyl.

8. A compound of the formula

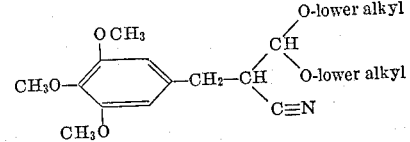

9. A compound of the formula

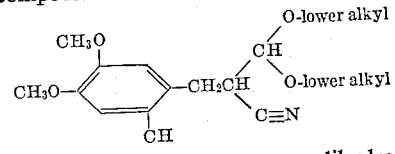

10. 3,4,5-trimethoxy-2'-cyano-dihydrocinnamaldehyde dimethyl acetal.

11. 2,4,5-trimethoxy-2'-cyano-dihydrocinnamaldehyde dimethyl acetal.

12. 2,4,5-trichloro-2'-cyano-dihydrocinnamaldehyde dimethyl acetal.

13. 4,5-dimethoxy-2-methyl-2'-cyano-dihydrocinnamaldehyde dimethyl acetal.

14. A process for the preparation of a compound of the formula

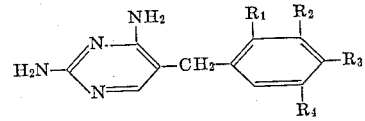

wherein $R_1$ is hydrogen, methyl, chlorine or methoxy; $R_2$ is hydrogen, chlorine or methoxy; and $R_3$ and $R_4$ are each either halogen, methyl or lower alkoxy; comprising reacting a compound of the formula

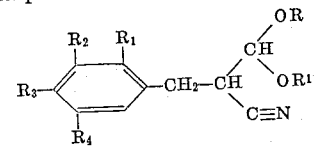

wherein $R_1$, $R_2$, $R_3$ and $R_4$ have same meaning as given above, and R and R' are lower alkyl with guanidine to give a compound of Formula I.

15. A process in accordance with claim 14, wherein $R_1$ is hydrogen, and $R_2$, $R_3$ and $R_4$ are lower alkoxy.

16. A process in accordance with claim 15, wherein $R_2$, $R_3$ and $R_4$ are methoxy.

17. A process in accordance with claim 14, wherein $R_1$ is methyl, $R_2$ is hydrogen, and $R_3$ and $R_4$ are methoxy.

References Cited

UNITED STATES PATENTS 3,049,544  8/1962  Stenbuck et al. _____ 260—256.4

OTHER REFERENCES

Migrdichian: Organic Synthesis, vol. 1, Reinhold Publishing Corp., New York, 1957, p. 106.

ALEX MAZEL, *Primary Examiner.*

M. O'BRIEN, R. GALLAGHER, *Assistant Examiners.*

UNITED STATES PATENT OFFICE
CERTIFICATE OF CORRECTION

Patent No. 3,341,541                        September 12, 1967

Max Hoffer

It is hereby certified that error appears in the above numbered patent requiring correction and that the said Letters Patent should read as corrected below.

Column 1, lines 17 to 19, the formula should appear as shown below:

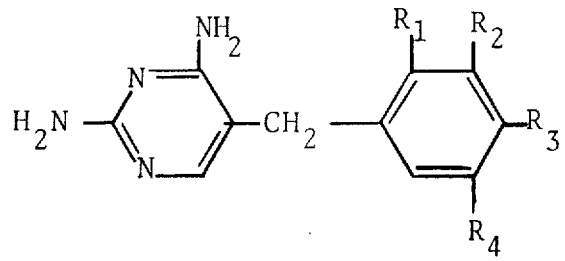

Column 7, lines 15 to 20, the formula should appear as shown below:

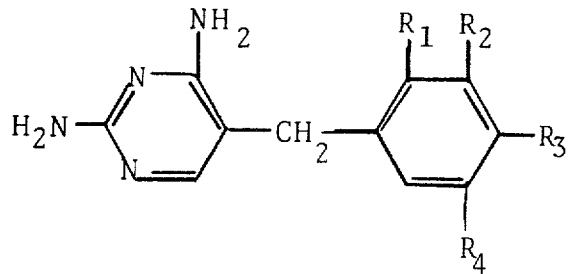

line 44, after "conditions" insert -- to form a compound of the formula --.

Signed and sealed this 29th day of July 1969.

(SEAL)
Attest:

EDWARD M. FLETCHER, JR.
Attesting Officer

WILLIAM E. SCHUYLER, JR.
Commissioner of Patents